May 22, 1945. J. E. F. GOBIN DIT DAUDE 2,376,684
RIVETING TOOL
Filed Aug. 8, 1941    2 Sheets-Sheet 2

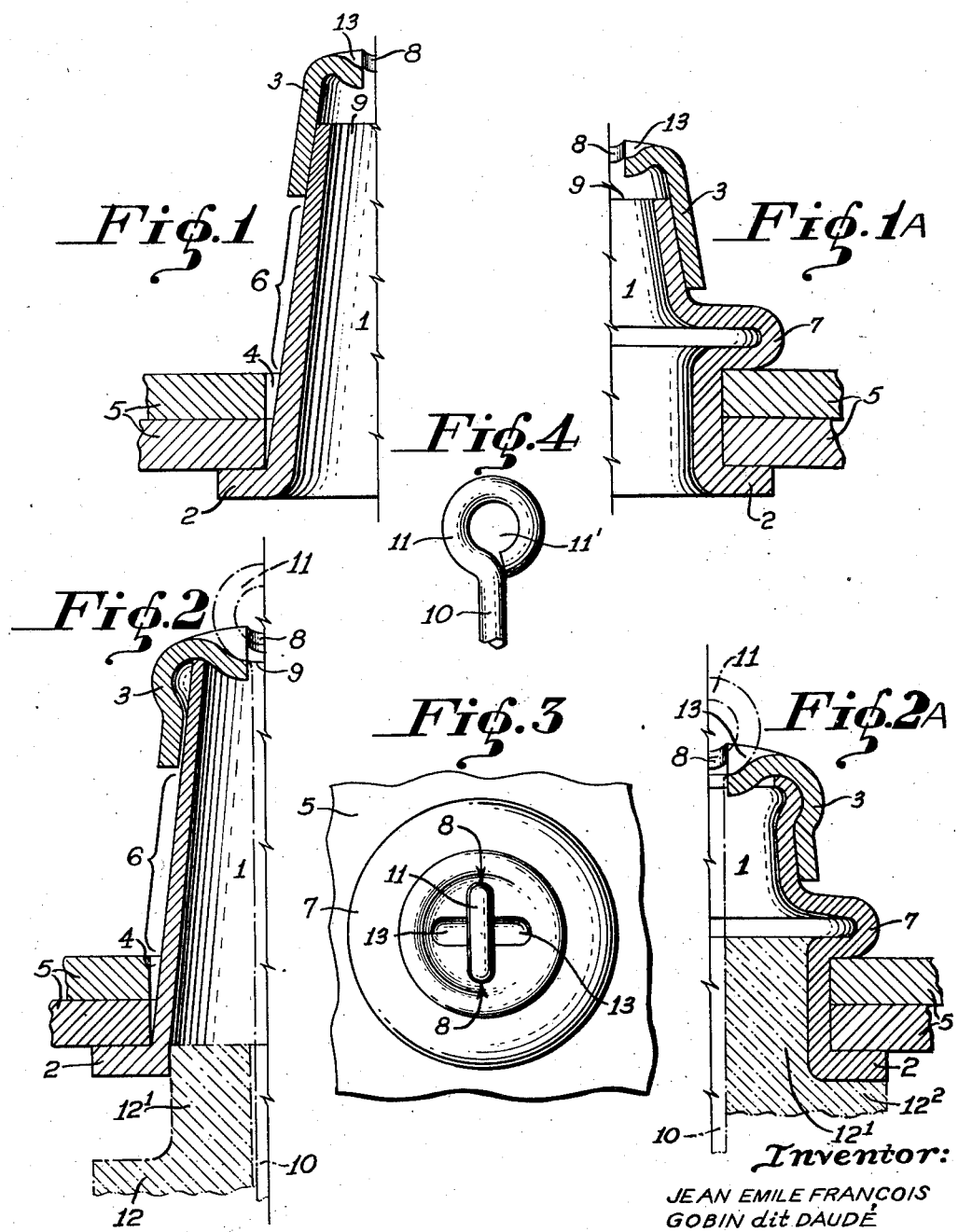

Inventor:
JEAN EMILE FRANÇOIS
GOBIN dit DAUDÉ

By Allt Holcombe
Attorney.

Patented May 22, 1945

2,376,684

UNITED STATES PATENT OFFICE 2,376,684

RIVETING TOOL

Jean Emile François Gobin dit Daudé, Neuilly-sur-Seine, France; vested in the Alien Property Custodian Application August 8, 1941, Serial No. 406,071
In France March 1, 1941

2 Claims. (Cl. 218—19)

My invention relates to a riveting tool for riveted joints and more particularly to those joints in which the plates or other parts to be riveted together are accessible only from one side of the joint.

The chief object of my invention is to provide a riveting tool for such a joint which is better adapted to meet the requirements of practice than those used for the same purpose up to the present time.

According to a feature of my invention, I reinforce a hollow rivet by fitting a cap or the like on the free end of the rivet shank behind the rear face of the joint and at a distance from said rear face so as to leave a non-reinforced portion of the rivet shank between said cap and said rear face, which portion is subsequently compressed by means of a pulling member preferably introduced into the shank from the front end thereof and adapted to act on said reinforcing element or cap, the compressed portion thus forming a flange bearing against the rear face of the joint.

According to another feature of my invention, I make use, for performing the operation above described, of a riveting tool including a pulling member having a flat head located in an axial plane so that it can be inserted in an elongated slot provided in the reinforcing cap and relatively rotated so as to bear against said cap and to permit of pulling it for compression of the rivet shank.

Other features of the present invention will appear from the following detailed description of specific embodiments thereof.

A preferred embodiment of the invention will be hereinafter described, with reference to the accompanying drawings, given merely by way of example, and in which:

Fig. 1 is an axial section of a hollow rivet made according to the invention, showing the rivet before the riveting operation. Fig. 1—a is a similar view showing the rivet after this operation has been performed;

Fig. 2 and Fig. 2—a are views similar to Fig. 1 and Fig. 1—a, showing a modification;

Fig. 3 is a plan view of a rivet according to the invention, after fixation thereof and while the riveting tool is being disengaged;

Fig. 4 is a partial elevational view of the head of the pulling member of the riveting tool;

Figure 6:
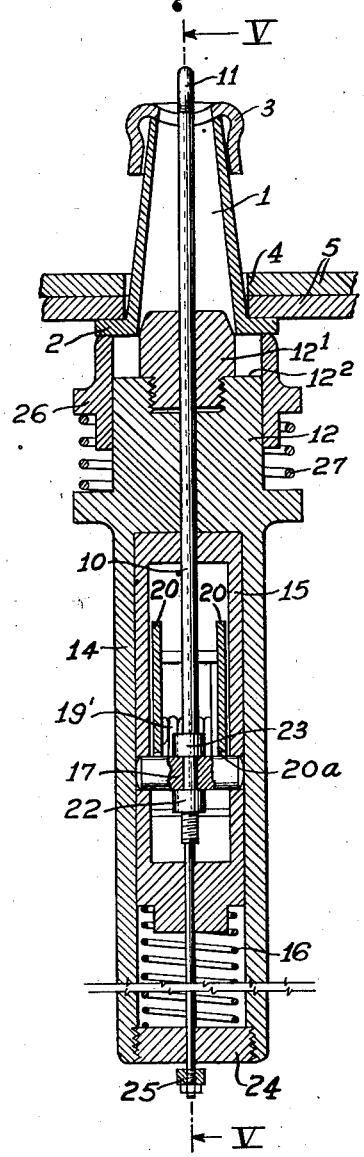
Fig. 6 is a sectional view corresponding to Fig. 5, on the line VI—VI thereof.

As shown by Figs. 1 and 2, the rivet according to my invention includes a hollow frusto-conical shank part 1, provided with a flange 2 at its larger end so as to bear against the front face of the joint and with a reinforcing cap 3 at the other end. Preferably, the wall of part 1 is made of gradually decreasing thickness from end 2 toward the other end.

The height of cap 3 is so chosen, relatively to the length of shank 1 and to the thickness of the plates 5 to be assembled together to form the riveted joint, that when the rivet is engaged in the hole 4 of said plates, with flange 2 applied against the front face of the joint, a non-reinforced portion 6 is left between the front edge of cap 3 and the rear face of the joint. The height of this portion 6 must be sufficient for supplying the metal necessary for forming by deformation the flange 7 to be finally obtained on the rear face of the joint (Figs. 1—a and 2—a).

Furthermore, the apex angle of the cone formed by shank 1 is so chosen that cap 3 can pass through hole 4 when the rivet is being inserted in position.

In order to fix the rivet, cap 3 must be forcibly pulled toward the front while flange 2 is kept applied against the front face of the joint. It compresses portion 6, which yields and flattens outwardly so as to form flange 7. The end of shank 1 which is inserted in cap 3 is prevented from expanding by the presence of said cap. As for the portion of said shank within hole 4, its expansion is limited by the wall of said hole, against which it is closely applied. Furthermore, as said portion of the shank is of greater thickness, it is less liable to deform, and in other ways I may give increased rigidity to this portion of the rivet shank to insure that the deformation takes place outside of the rivet hole.

Cap 3 may be removed after the riveting operation.

In the modification illustrated by Fig. 2 and Fig. 2a, the rounded end of cap 3 forms an annular enlarged portion so that, when the rivet is compressed, the end of shank 1, brought into contact with the cap bottom expands in said enlarged portion against the inner wall of which it is applied, so that cap 3 and shank 1 are secured together.

It should be noted that the rivet proper, i. e. shank 1, with its flange 2, is a standard tubular piece, so that the only element to be specially manufactured for carrying out the invention is cap 3.

The axial compression which serves to fix the rivet in position is performed in any suitable manner. When only one side of the riveted joint is accessible, it is advantageous to proceed in the following manner:

Cap 3 is provided with an elongated aperture 8 in its bottom, the length of said aperture or slot being substantially equal to the inner diameter of shank 1 at its smaller open end 9.

The riveting tool includes a pulling member 10 (Fig. 4) consisting of a steel wire 10 the end of which is bent so as to form a loop 11 the outer diameter of which is just a little smaller than the length of slot 8. The inside of the loop is filled with solder or the like 11' so as to form a solid flat circular head adapted to pass through the head 9 of shank 1 and the slot 8 of cap 3.

Figure 5:
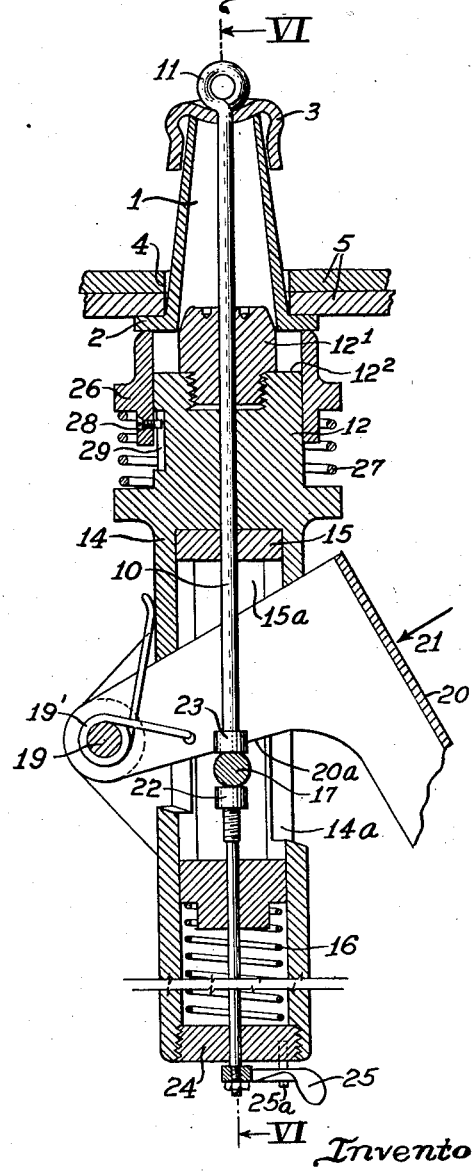
Fig. 5 is a sectional view of the riveting tool, on the line V—V of Fig. 6.

Rod 10 is mounted in a hollow cylindrical body 14 (Figs. 5 and 6) in which it can both slide in the direction of its axis and rotate about said axis. This body 14 includes, at its upper end, a part 12 adapted to support the rivet during the riveting operation and fitted with a nose $12^1$ (for instance screwed thereon) having a frusto-conical end and a cylindrical part adapted to be forced into the rivet shank at the beginning of the riveting operation. A sliding member 15 is mounted inside body 14 and it is urged toward part 12 by a spring 16. This member 15 carries a transverse pin 17 through which rod 10 extends, two abutments 22 and 23 carried by said rod bearing on the cylindrical wall of said pin on either side thereof. Thus, as far as longitudinal sliding movements are concerned, the inside body 14, the member 15 and the rod 10 move together.

Body 14 carries a pivot 19 about which can rotate an operating lever 20 movable in radial slots $14a$ and $15a$ of body 14 and sliding member 15 respectively. The edges $20a$ of this lever bear against pin 17. Thus, when lever 20 is pivoted in the direction of arrow 21 (Fig. 5), it causes pivot 19 (together with body 14 on which it is mounted) and pin 17 (together with sliding member 15 and rod 10, with which it is connected) to move in opposite directions (the first upwardly and the second downwardly) with respect to each other, against the action of springs 16 and 27. The lever 20 is normally urged in the direction opposite to the arrow 21, by the spring 19' coiled on the pivot 19.

Rod 10 extends through the bottom 24 of body 14 and it is provided, at its lower end, with a handle 25 for rotating said rod about its axis, this rotation being limited by at least one abutment pin $25a$.

Part 12 carries, slidably mounted thereon, an annular part 26, urged upwardly by a spring 27 interposed between parts 12 and 26, the longitudinal movement of part 26 with respect to part 12 being limited by a pin 28 carried by part 26 and engaging in a longitudinal slot 29 of part 12.

This device works in the following manner:

The rivet is first fitted on the riveting tool as follows: The flange 2 of said rivet is pressed against the edge of part 26 so as to force the latter downwardly on part 12 against the action of spring 27, care being taken that the slot 8 of cap 3 is in line with the head 11 of rod 10, so that said head can pass upwardly through said slot. When said head 11 projects fully above cap 3, handle 25 is turned through 90° and the axial thrust exerted on the rivet is released. Thus, under the effect of spring 27, head 11 is tightly applied in a hollow 13 provided on the external wall of cap 3 at right angles to slot 8. The rivet is thereby held at the end of the riveting tool.

The rivet is then inserted in the holes 4 of plates 5 so that its flange 2 is applied against the front face thereof.

Lever 20 is now pivoted in the direction of arrow 21. As a consequence of this movement, nose $12^1$ is first forced into shank 1 until the shoulder $12^2$ of part 12 comes to bear against flange 2 of the rivet and the portion of shank 1 located inside holes 4 is thereby expanded against the wall of said holes until said portion of the shank is made substantially cylindrical. Then cap 3 is pulled downwardly by rod 10 through the medium of the head 11 thereof, thus deforming the portion 6 of the shank (Fig. 2) so as to crush it into the form of a flange 7, where the rivet is set. It then suffices to release lever 20, whereupon spring 16 returns rod 10 to the upper limit of its movement, and to turn back handle 25 through 90°. It is then a simple matter to remove the wedged-in hose 12' from the shank 1 of the rivet by the manual withdrawal of the riveting tool from the work. And then to completely remove the riveting tool from the rivet, by passage of head 11 through slot 8.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention.

What I claim is:

1. In a riveting tool for setting a tubular rivet provided with a compression tip having a slot, the combination of a body; a head mounted on one end of the body and adapted to be intruded into the rivet; an annular member resiliently mounted on the body adjacent said end, and adapted to bear against one end of the rivet; a carriage reciprocably mounted in said body; means to reciprocate said carriage; a rod slidable in said body, having its ends extending from said body and rotatably mounted on said carriage; a loop on the end of said rod extending through the head; and a crank on the end of said rod extending through the opposite end of the body; the loop having a thickness slightly less than the width of the slot in the tip of the rivet, and a width slightly less than the length of the said slot, so that the loop can pass through the slot when the rod is in one position and will engage the tip of the rivet when the rod is turned by the crank through an angle of 90°.

2. In a riveting tool for setting a tubular rivet provided with a compression tip having a slot, the combination of a body provided with a chamber and a bore; a head mounted on one end of the body and having a bore concentric with the bore in the body; an annular member slidable on the body adjacent said end, spaced from said head and adapted to bear against one end of the tubular rivet to be set, resilient means urging said member toward said end, means to limit the movement of said member relative to the body; a carriage slidable in said chamber; a lever pivoted on said body, bearing on said carriage and adapted to move the carriage in one direction relative to said body; a spring urging said carriage in the opposite direction; a rod slidable in said bores, having its ends extending from the body and rotatably mounted on said carriage; a loop on the end of said rod extending through the head; and a crank on the end of said rod extending through the opposite end of the body; the loop on the rod having a thickness slightly less than the width of the slot in the tip of the rivet, and a width slightly less than the length of the said slot, so that the loop can pass through the slot when the rod is in one position and will engage the tip of the rivet when the rod is turned by the crank through an angle of 90°.

JEAN EMILE FRANÇOIS
GOBIN DIT DAUDÉ.